(No Model.) 9 Sheets—Sheet 1.

J. E. BUCKLIN & J. F. HARTIGAN.
CIGARETTE MACHINE.

No. 578,715. Patented Mar. 16, 1897.

(No Model.) 9 Sheets—Sheet 7.

J. E. BUCKLIN & J. F. HARTIGAN.
CIGARETTE MACHINE.

No. 578,715. Patented Mar. 16, 1897.

(No Model.) 9 Sheets—Sheet 8.

J. E. BUCKLIN & J. F. HARTIGAN.
CIGARETTE MACHINE.

No. 578,715. Patented Mar. 16, 1897.

Witnesses
G. A. Pauberschmidt,
J. D. Kingsbury.

Inventors
John E. Bucklin
Joseph F. Hartigan
By Whitaker & Prevost, Attys.

THE NORRIS PETERS CO., PHOTO-LITHO., WASHINGTON, D. C.

UNITED STATES PATENT OFFICE.

JOHN E. BUCKLIN AND JOSEPH F. HARTIGAN, OF WASHINGTON, DISTRICT OF COLUMBIA, ASSIGNORS TO LORENZO D. LORENTZ, TRUSTEE, OF SAME PLACE.

CIGARETTE-MACHINE.

SPECIFICATION forming part of Letters Patent No. 578,715, dated March 16, 1897.

Application filed October 16, 1895. Renewed August 11, 1896. Serial No. 602,459. (No model.)

*To all whom it may concern:*

Be it known that we, JOHN E. BUCKLIN and JOSEPH F. HARTIGAN, citizens of the United States, residing at Washington, in the District of Columbia, have invented certain new and useful Improvements in Cigarette-Machines; and we do hereby declare the following to be a full, clear, and exact description of the invention, such as will enable others skilled in the art to which it appertains to make and use the same.

Our invention consists in the novel features of construction and combination of parts hereinafter described, reference being had to the accompanying drawings, which illustrate one form in which we have contemplated embodying our invention, and said invention is fully disclosed in the following description and claims.

Referring to the said drawings, Fig. 2 represents a side elevation of the same. Fig. 2$^a$ is a detail view of one of the adjustable presser-fingers of the rod-forming devices.

In the drawings, A represents the main frame of the machine, which consists in this instance of two side frames, each having a planed upper face, said frames being connected by suitable braces and so arranged that the said upper faces will be held parallel and a short space apart. At one end of the main frame are the group of elements constituting the tobacco dressing and feeding devices, arranged in a suitable framework and supported upon the main frame.

Figure 1:
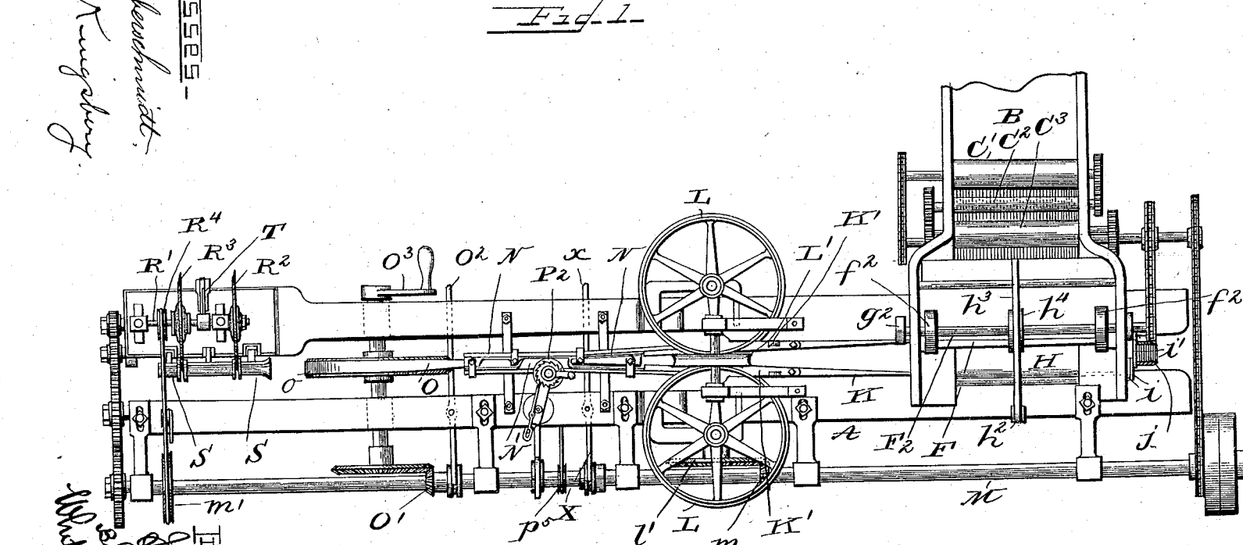
Figure 1 represents a top plan view of a cigarette-machine constructed according to and embodying our invention.
Figures 2, 2A:
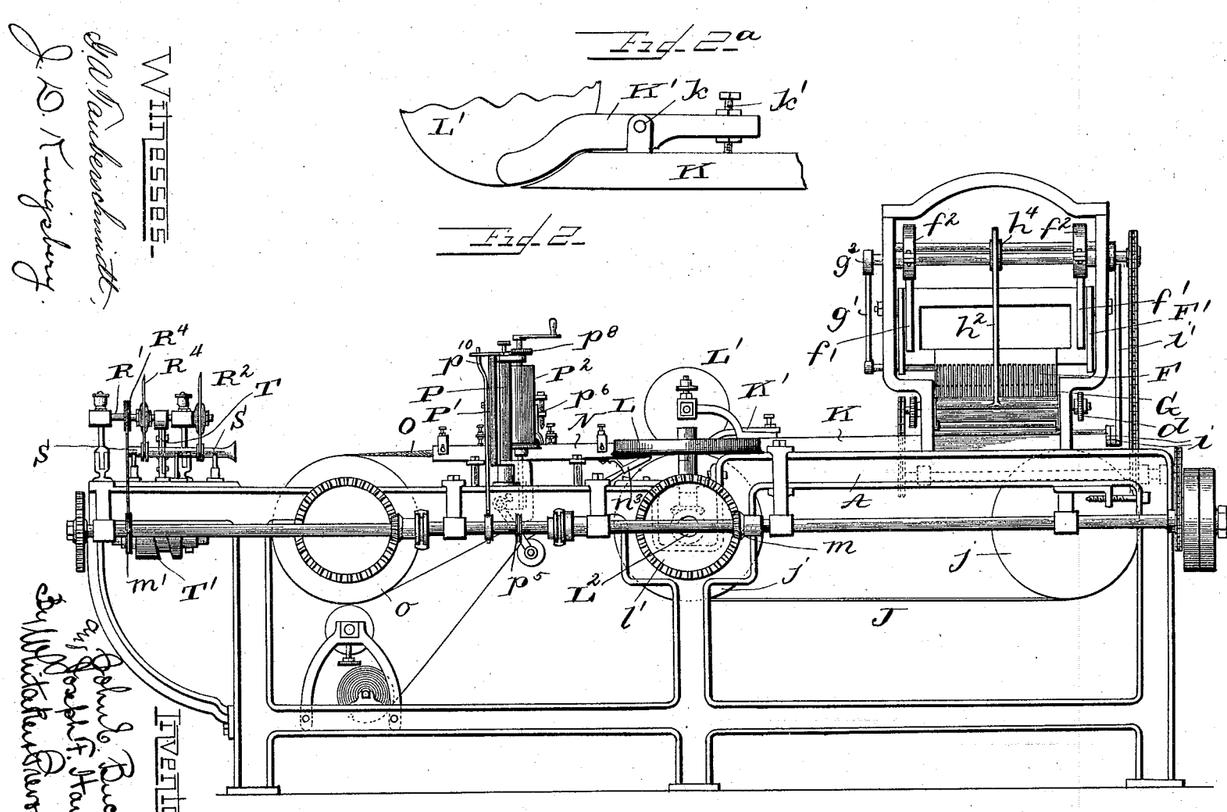
Figure 3:
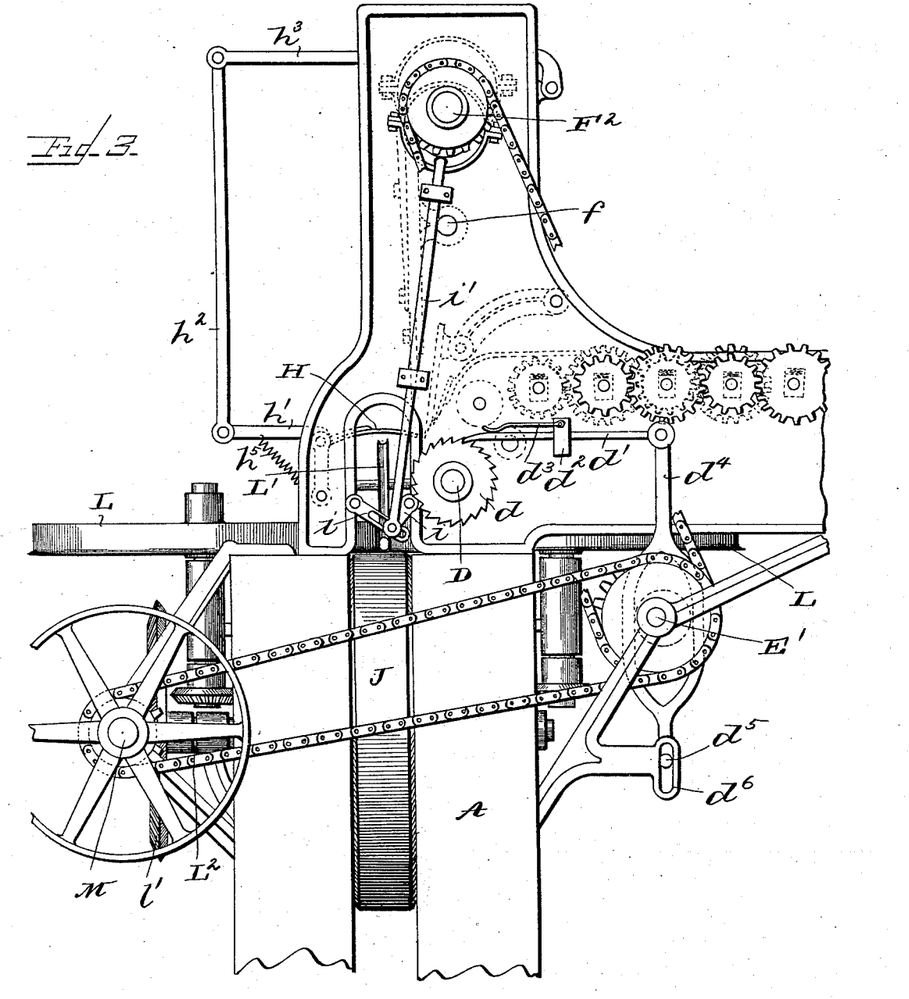
Fig. 3 represents an end view of the machine on an enlarged scale, showing the exterior of the tobacco feeding and dressing devices.
Figures 4, 22:
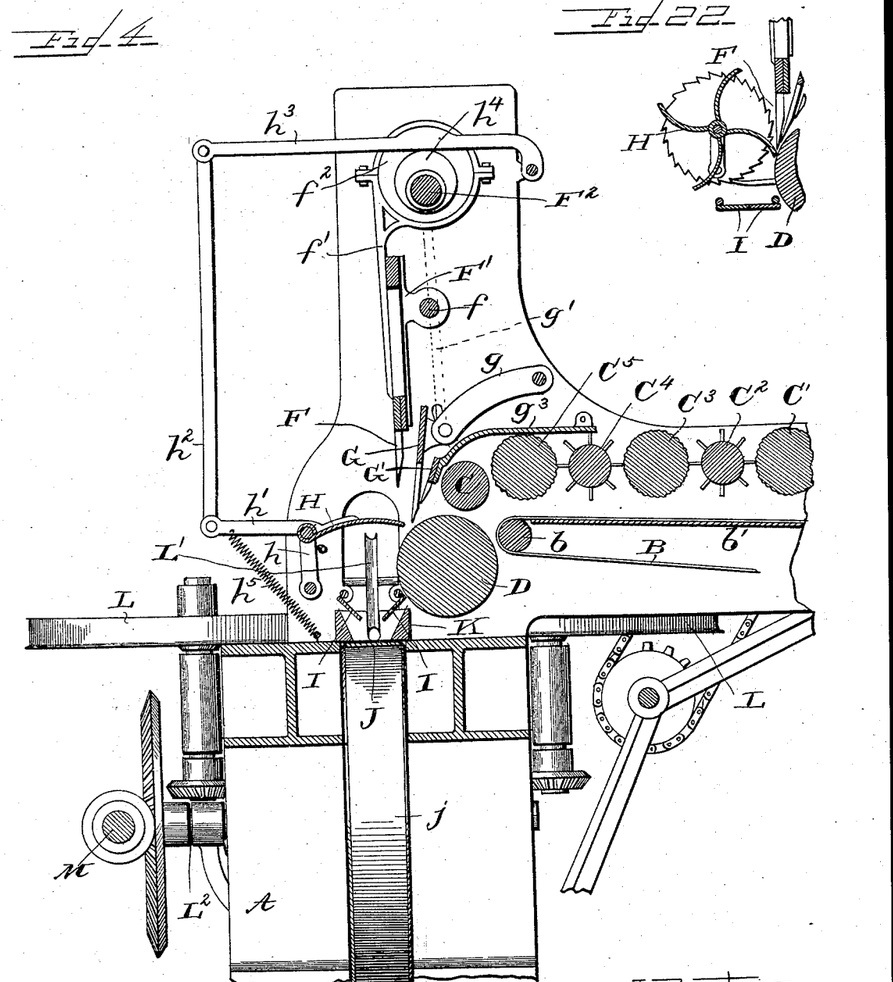
Fig. 4 represents a transverse sectional view of the machine through the tobacco feeding and dressing devices.
Fig. 22 is a detail view of a modification of the cleaner for the multimotioned rake.

The tobacco dressing and feeding devices are shown in Figs. 1 and 2 and on an enlarged scale in Figs. 3 and 4.

B represents a feeding belt or apron, which may be plain or toothed, as preferred, and is carried by suitable rollers $b$, and has its upper part supported, preferably, between the said rollers by a plate $b'$ to prevent sagging. Above this feeding-belt we arrange a series of rollers $C'\ C^2\ C^3\ C^4\ C^5$, alternate rollers being corrugated and toothed, the said rollers being arranged in a plane inclined slightly in a downward direction toward the discharge end of the apron B, so as to gradually compress the tobacco upon the belt. These rollers are geared so that each one is rotated at a higher speed than the one preceding it, so that they have a spreading action upon the tobacco, which loosens it up and tends to spread it in an even sheet upon the apron B.

C represents an idle-roller adjacent to the end of apron B, operated by frictional contact with the tobacco passing beneath it, and below the roller C is a feeding-roll D, which receives the sheet of tobacco from the apron B, thus giving it a final compression between the rollers C and D. The feed-roller D is operated intermittently, in this instance by means of a pawl-and-ratchet mechanism. (Illustrated in Fig. 3.) The shaft of roll D is provided with a ratchet-wheel $d$, which is engaged by a horizontally-sliding pawl $d'$, passing through a guide $d^2$, to which is secured a spring $d^3$, which engages the pawl and holds it onto the ratchet-wheel. The outer end of pawl $d'$ is connected pivotally with one end of a slotted yoke $d^4$, which is operated by a cam on the counter-shaft E' of the machine, the lower end of the said yoke having a pin $d^5$ engaging a slot $d^6$ in a bracket secured to the frame of the machine.

The tobacco is removed from the feeding-roll D by means of a multimotioned rake F, which is mounted in vertical guides in an oscillating frame F', pivoted at $f$ to the sides of the framework. To this rake are secured a pair of eccentric-rods $f'$, each terminating at its upper end in an eccentric-strap engaging an eccentric $f^2$ on a shaft F². By means of this eccentric and the oscillating guiding-frame F' the rake is given an up-and-down motion and also a horizontal reciprocating motion, as will be readily understood.

G represents a vertically-moving retaining-comb which is hung on pivoted arms $g$ $g$ in rear of the rake F and operated by an eccentric rod and strap $g'$ and an eccentric $g^2$ on the shaft F². (See Fig. 4.)

G' represents a stationary cleaning-comb supported over the sheet of tobacco by a spring-plate $g^3$ and having its teeth alternating with the teeth of the comb G. The operation of the feeding and dressing devices up to this point is as follows: The tobacco is spread by the operator upon the endless apron B and is gradually moved forward under the rolls C' C², &c., which loosen it up and spread it evenly upon the apron, at the same time gradually compressing the sheet until it passes between the rolls C and D. When the feed-roll D is operated, the tobacco will be fed forward, so as to push out enough to form a cigarette-rod of a length substantially equal to the width of the feeding devices. The comb G is then moved down into the tobacco, its teeth passing between the teeth of the cleaning-comb G'. While the tobacco is held by comb G the multimotioned rake is moved down into the tobacco adjacent to the comb G, and its teeth are then thrown forward in a horizontal direction, thus combing off the tobacco projecting beyond the comb G and separating it from the main sheet. The comb G then rises, and as the teeth pass upwardly through the comb G' they are cleaned, so that the machine will not become choked.

H represents a movable cleaner for the rake F'. In Fig. 4 this is shown as consisting of a single blade pivotally secured to the upper ends of pivoted arms $h$ $h$, secured to the frame of the feeding device, said blade being provided with an operating-arm $h'$, operated through a connecting-link $h^2$ by a pivoted lever $h^3$, having a shoe engaging an operating-cam $h^4$ on the shaft F². A spring $h^5$ holds the cleaner in its normal position. When the rake F has separated a portion of the tobacco from the sheet, it is struck by the cleaner H, and the cleaner-blade is then depressed by means of its cam, so that it scrapes the tobacco off from the rake and deposits it upon two horizontally-disposed plates I I, which we term the "dumping-plates," which are located above the travel of the rod-forming belt through the machine.

In Fig. 22 we have shown a slightly-modified form of cleaner, which consists of a plurality of blades extending radially from a central operating-shaft. In using this form of cleaner the device will be rotated intermittently by suitable mechanism to bring the blades into operative relation with the rake to remove the tobacco from the same.

In the central portion of the machine, above a line between the two side frames and beneath the dumping-plates I, is located a longitudinal tobacco-guide K, which is open at the top and bottom, the bottom of the guide being formed by the tobacco-carrying belt J, which is carried by suitable wheels or pulleys $j$ $j$, (see Fig. 2,) supported vertically in the main frame. Beneath the dumping-plates the guide is constructed as shown in cross-section, Fig. 4, the inner walls flaring outwardly from bottom to top, so as to receive the tobacco from the dumping-plates. After the tobacco has been deposited by the rake F upon said plates the latter are dumped by means of devices illustrated in Fig. 3, so as to deposit the tobacco in the tobacco-guide upon the tobacco-carrying belt. To each of said plates an arm $i$ is secured at one end of the feeding mechanism, said arms being slotted, as shown. A longitudinally-movable rod $i'$ is secured in guides upon the side of the feeder-frame and has its lower end pivotally connected with said arms $i$ $i$ by means of a pin engaging the slots of both arms. This rod is reciprocated at the proper time by means of a grooved cam on the shaft F² of the feeding mechanism, which is engaged by a friction roll or stud on the said rod. As soon as the dumping-plates have been operated they are returned by the cam to their horizontal positions, so as to receive the next charge of tobacco, while the tobacco deposited upon the tobacco-carrying belt is carried forward thereby in the tobacco-guide K.

Figure 13:
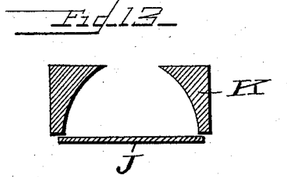
Figs. 13 and 14 are a transverse section and end view, respectively, of the tobacco-guides for guiding the tobacco from the feeding devices to the stem-forming devices.
Figure 14:
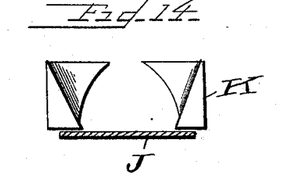

The guide K beyond the end of the feeding devices has its upper inner edges drawn in until they form an arch construction, as shown in Figs. 13 and 14, above the tobacco-carrying belt J, thereby gradually compressing the tobacco upon the belt and giving its upper portions a rounded form.

Adjacent to and above the forward belt-carrying wheel $j$ are located a pair of horizontal compressing wheels or rollers L L, (see Figs. 5 and 6,) having the lower edges of their peripheries provided with meeting flanges $l$, and between these wheels in line with their centers is a vertically-disposed grooved wheel or roll $L'$, having its peripheral portions coming between and in frictional contact with the upper or plain portions of the horizontal wheels L, thus forming a circular orifice of the size of the tobacco rod to be formed. It will be seen that as these rollers or wheels are operated the tobacco will be compressed gradually between them on account of the curvature of their tobacco-engaging surfaces until it is formed through the before-mentioned circular opening, as will be readily understood from Figs. 5 and 6.

M represents the main driving-shaft, which extends the whole length of the main frame and is supported along one side of the same. This shaft is provided in this instance with a pinion $m$, which drives a gear $l'$ on a cross-shaft $L^2$, which carries the belt-wheel $j$, and is also provided with a pair of pinions $l^2 l^2$, each of which drives a pinion $l^3$ on a vertical shaft, upon the upper end of which is mounted one of the horizontal compressing-wheels L, thus driving said wheels. The vertical wheel $L'$ is supported in vertically-adjustable bearings, as shown, so that it can be raised and lowered to increase or decrease the size of the tobacco rod. In this instance we have shown the shaft of the vertical wheel $L'$ provided with bearings $l^4 l^4$, movable in vertical slots in the supports for said wheel, and set-screws $l^5 l^5$, extending through said supports and engaging said bearings for adjusting them in said vertical slots.

Figures 5, 21:
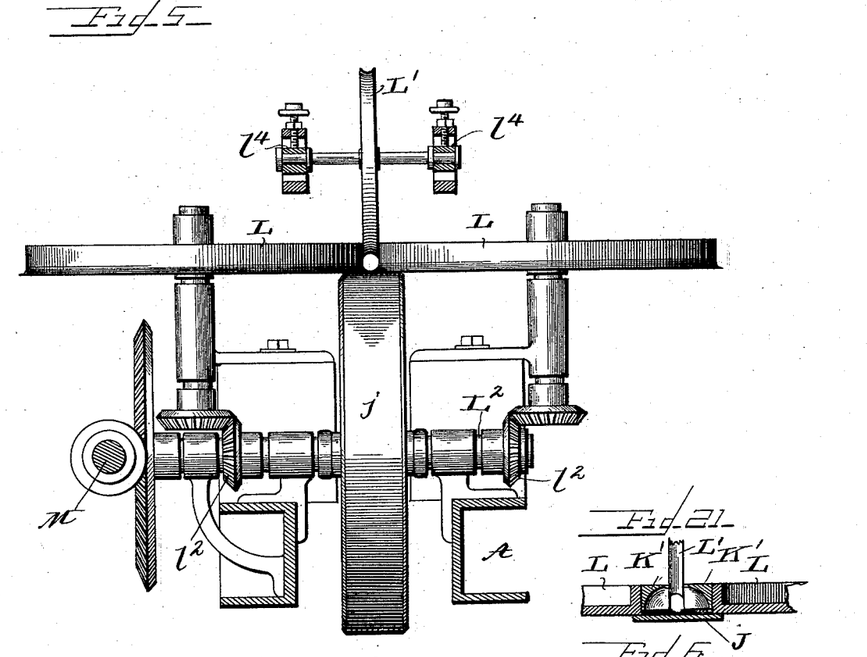
Fig. 5 represents a detail view, still further enlarged, of the devices for forming the tobacco rod.
Fig. 21 represents a vertical section on line 21 21, Fig. 6.
Figure 6:
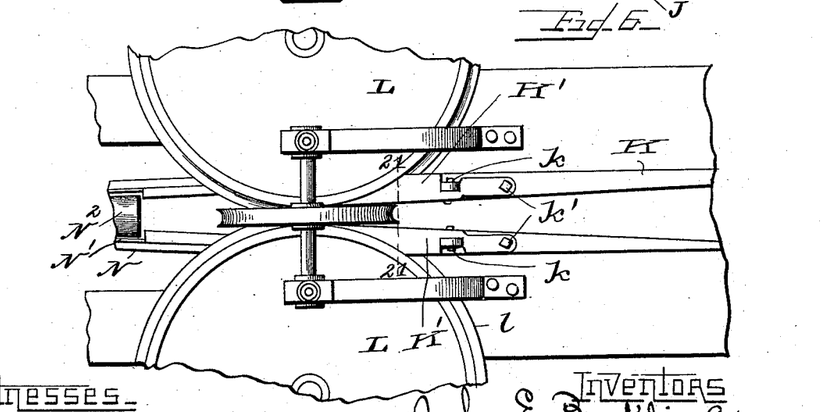
Fig. 6 is a top plan view of the rod-forming devices illustrated in Fig. 5.
Figure 7:
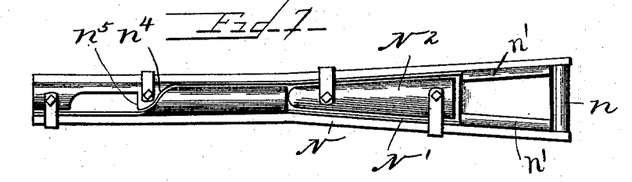
Fig. 7 is a top plan view of the stem or continuous-cigarette forming devices.

In order to guide the tobacco into the bite of the wheels L L and $L'$, we provide a pair of vertically-adjustable fingers $K' K'$. (Shown best in Figs. 6, $2^a$, and 21.) These fingers are pivotally secured to and form a continuation of the walls of the tobacco-guide K and have curved overhanging portions for engaging the upper side of the tobacco and gradually compressing it as it nears the compressing-wheels, said fingers being so shaped as to accommodate the said wheels and prevent the escape of tobacco adjacent to them. These fingers are pivoted at $k$ to the walls of the tobacco-guide and have rearwardly-extending arms provided with adjusting set-screws $k'$, so that they may be adjusted to compress the tobacco more or less, according to its condition.

Immediately beyond the compressing rollers or wheels are located the stem-forming devices for folding a continuous web of paper around the tobacco rod, pasting it, and forming a continuous stem or cigarette, to be afterward cut, as hereinafter described, into individual cigarettes.

Figures 8, 9, 10, 11, 12:
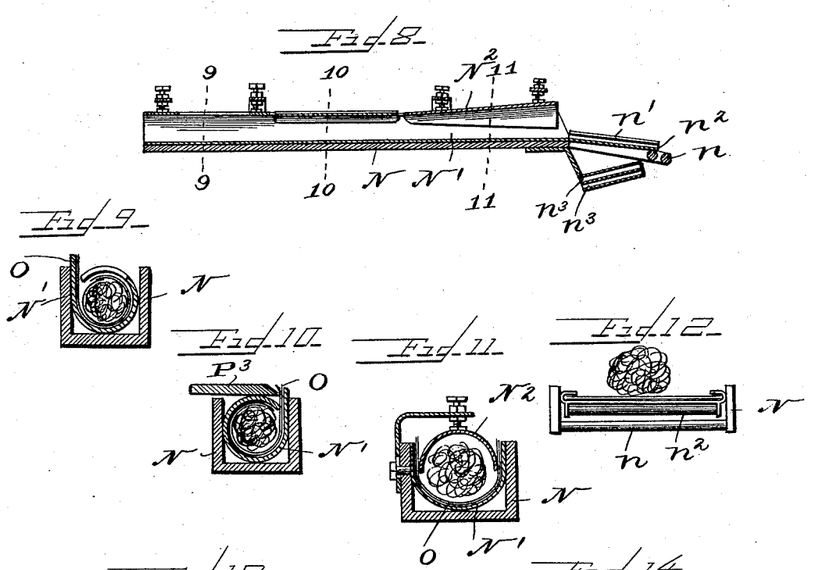
Fig. 8 is a vertical transverse sectional view of the same.
Fig. 9 represents a transverse section of said stem or continuous-cigarette forming devices, taken on line 9 9 of Fig. 8.
Fig. 10 is a similar section on line 10 10 of Fig. 8.
Fig. 11 is a similar section on line 11 11 of Fig. 8.
Fig. 12 is an end view of the stem-forming devices.

N represents a trough or casing supported by cross-bars secured to the top face of the side frames and extending longitudinally of the machine, the end nearest the compressing-wheels being wider than the other end and of tapered form, the extreme end portion being bent downwardly, as shown in Fig. 8, to enable it to extend slightly beneath the same to receive the tobacco rod. To the end of the depressed portion of the trough is secured the paper guide or roller $n$. This trough is preferably made of cast metal, and within it is placed a sheet-metal forming-tube $N'$, which is secured therein and supported thereby. This tube is open on its upper side for a portion of its length at the wider end of the trough and is provided above the depressed portion of the trough with lateral guiding-flanges $n' n'$ for the stem-forming belt and paper and at its extreme end with a guide rod or roll $n^2$ for the belt, as shown in Figs. 8 and 12. Just forward of the guides $n' n'$ the tube is formed in cross-section, as shown in Fig. 11, and above the tube is supported a curved tapering presser-plate $N^2$, which is supported at each end by screw-threaded adjusting devices, as shown, from a bracket-arm secured to the trough N. By means of this construction the said plate $N^2$ can be raised or lowered to form stems of different sizes, and in case the tobacco is very dry and elastic one end may be raised to let the tobacco pass beneath it more readily.

The stem-forming belt O passes around a belt-wheel $o$, supported on a cross-shaft driven by suitable gearing from the main driving-shaft M, (see Fig. 2,) and thence passes over suitable guides to the guide-roller $n^2$ on the tube $N'$, thence through said tube to the pulley or wheel $o$. The paper is drawn from a suitable spool supported revolubly in the main frame and passes over the guide $n$ on the trough N, thence through the tube $N'$ upon the belt O. In order to insure the holding of the belt and paper in proper relations, the trough N is provided at its rear end with a depending bracket carrying a pair of guides $n^3 n^3$ in line, respectively, with the guides or rollers $n n^2$, as shown in Fig. 8.

When the belt and paper are passing beneath the presser-plate $N^2$, both edges of the paper and belt are held in a vertical position against the vertical sides of the tube between them and the edges of the presser-plate, as shown in Fig. 11. Beyond the end of the presser-plate $N^2$ the tube $N'$ has one side curved up and over nearly to the other side wall, as shown best in Fig. 10, thus folding one edge of the paper and belt upon the tobacco while the other edge of the belt and paper is held in a vertical position and extends upwardly, so as to be engaged by the pasting-roller, as shown in Fig. 10, which pastes this edge of the paper.

Beyond the point where the paper is pasted the tube $N'$ is provided with a curved slot $n^4$, extending from one side of the tube to the other, and a lip $n^5$ is formed upon one edge of the slot, beyond which the tube is cut away, as shown, to admit air to the pasted parts to assist in drying the same. (See Fig. 9.) At the point where the curved slot $n^4$ occurs the pasted edges of the paper and the edge of the belt adjacent thereto are folded over upon the already-folded edge of the paper, and the pasted portions then pass beneath the lip $n^5$, which presses them together, while the edge of the belt which was first folded over is passed over the lip $n^5$, thus preventing the pasting of the pasted edge of the paper onto the opposite edge of the belt. At its discharge end the tube N' is substantially circular, as shown, and the belt leaves it wrapped snugly around the pasted cigarette-stem. After leaving the tube N' the belt opens, and while it supports the stem beneath the same allows it to dry by admitting air to it.

Figure 15:
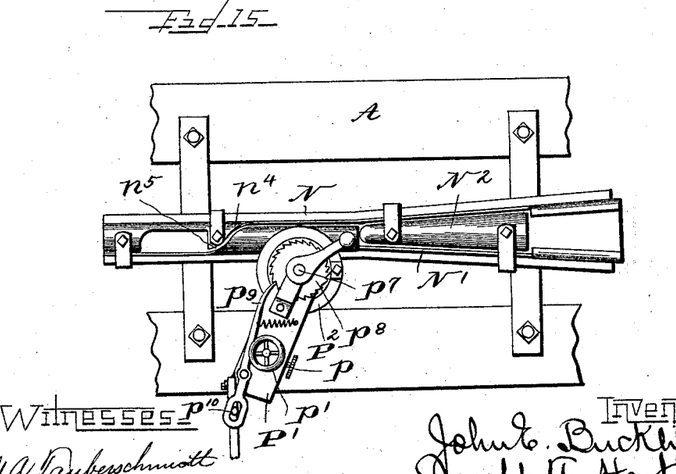
Fig. 15 is a top plan view showing the stem-forming devices and the pasting mechanism.
Figures 16, 17:
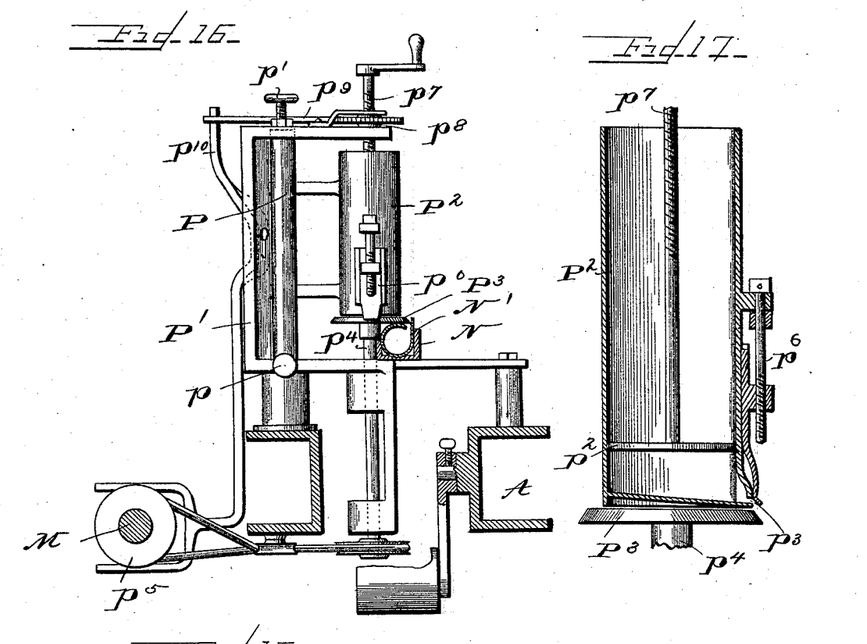
Fig. 16 is an enlarged view in elevation of the pasting mechanism.
Fig. 17 is an enlarged sectional view of the paste-reservoir, showing beneath the same the paste-wheel in elevation.

The devices for operating the paste-wheel and supplying paste thereto are illustrated in detail in Figs. 15, 16, and 17. Upon one of the side frames is a vertical pillar P, upon which the frame P', carrying the pasting mechanism, is pivotally hung, the said pillar engaging an aperture in the lower part of the frame and a recess in the upper part of the same. The lower part of the frame is provided with a set-screw $p$ for engaging said pillar and securing the frame in any position to which it may be adjusted, and the upper part of the frame is provided with an adjusting-screw $p'$, engaging the top of the pillar to raise and lower the frame slightly to adjust the paste-wheel with respect to the paper, as will be apparent in Fig. 16.

$P^2$ is the paste-receptacle, preferably cylindrical in form, supported in the pivoted frame and provided internally with a piston or follower $p^2$ to force the paste out through a discharge-aperture $p^3$, located at one side and adjacent to the bottom of the receptacle. The bottom of the receptacle is preferably inclined downwardly toward the discharge-opening to assist in forcing the paste out. Beneath the paste-receptacle is the horizontal paste-wheel $p^3$ on the upper end of a shaft $p^4$, supported in a depending portion of the pivoted frame and having a band-pulley at its lower end connected by a belt with a pulley $p^5$ on the driving-shaft M for driving the paste-wheel. The paste-wheel projects beyond the periphery of the receptacle $P^2$ and has a beveled face, upon which the paste is deposited from the discharge-opening in said receptacle, the said discharge-opening being above a portion of the paste-wheel at a distance from the part in engagement with the paper, as indicated in Fig. 16. The discharge-opening is so located as to be above the upper part of the beveled portion of the wheel and is controlled by a sliding gate or valve $p^6$, which is mounted in guides on the paste-receptacle and is provided with an adjusting-screw, so that the amount of paste deposited upon the wheel can be accurately determined. The follower $p^2$ is provided with a screw-threaded stem $p^7$, which is provided with a nut $p^8$ in the form of a ratchet-wheel. This nut is operated intermittently by a pivoted pawl $p^9$, having at one end a slot engaged by a pivoted lever $p^{10}$, having its lower end provided with a fork engaging a cam on the shaft M for imparting the desired movement to the pawl and ratchet and thus feeding the paste. The stem $p^7$ is provided with a handle, so that it may be turned by hand when desired.

It will be observed that by loosening the set-screw $p$ the whole frame may be swung around out of the way to give access to the stem-forming tube.

At the end of the main frame is located the cutting mechanism for separating the stem into individual cigarettes. The cutting devices proper consist of one or more revolving circular knives which are moved into contact with the stem and are also given a longitudinal movement while they are cutting the stem and being withdrawn therefrom to prevent bruising the stem by stopping its progress as a stationary cutter would.

Figure 19:
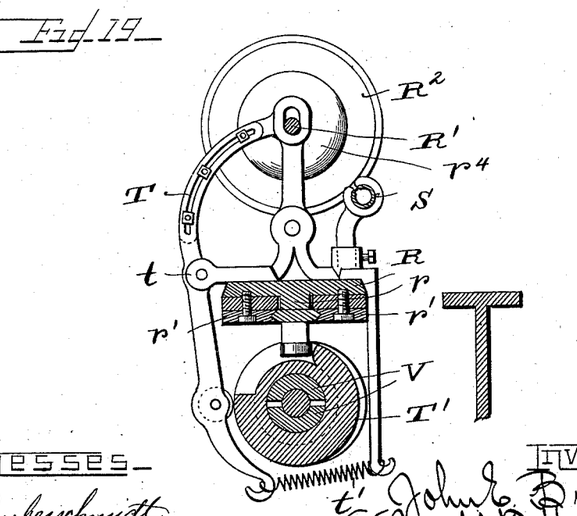
Fig. 19 is an end elevation, partly in section, of the same.

The cutting mechanism is supported by a reciprocating base-plate or carriage R, which is movable longitudinally of the machine. In this instance I have shown the said plate supported upon the top face of one of the side frames of the machine and having a central rib $r$ extending downwardly through a longitudinal slot in the frame and provided with guiding portions engaging grooved guide-plates $r'$, secured to the under side of the top of the frame. Upon this movable plate are located a pair of removable tubular guides S S for the cigarette-stem, which are provided with shanks engaging sockets secured to the plate and held in said sockets by set-screws, as indicated in Fig. 19. A pair of pivotally-mounted hangers carry the cutter-shaft R', upon which are secured two revolving cutter-blades $R^2$ $R^3$ at a distance apart equal to the length of a cigarette.

We prefer to clamp the cutter-blades between collars, so that they can be removed when desired, and we also prefer to have one blade adjustable with respect to the other to vary the length of the cigarettes. In this instance we have shown the shaft provided with a rigid collar $r^2$ adjacent to one end, the rigid blade being clamped between said collar and a movable collar $r^3$ by a nut, as shown. The adjustable blade is clamped between two collars $r^4$ $r^4$, which have screw-threaded apertures engaging threaded portions of the shaft, so that the cutter may be adjusted and then clamped in its adjusted position. The shaft R' is also provided with a belt-pulley $R^4$ for driving the same continuously by means of a belt from a similar pulley $m'$ on the main driving-shaft M. (See Figs. 1 and 20.) The belt is held taut in all positions by a spring-actuated belt-tightener $R^5$. (See Fig. 20.) The shaft R' is engaged by a slotted operating-lever T, pivoted to the main frame at $t$ and having its lower end provided with a friction-roll in engagement with a cam T' on a knife-operating shaft driven from the main shaft, said cam having a grade which throws the cutter-blades across the path of the cigarette-stem to sever the same. A spring $t'$ holds said arm in engagement with the cam, and the upper part of the arm is made in two parts connected by bolts or screws, one part being slotted to allow the arm to be adjusted so as to secure the proper movement of the cutters.

Figure 18:
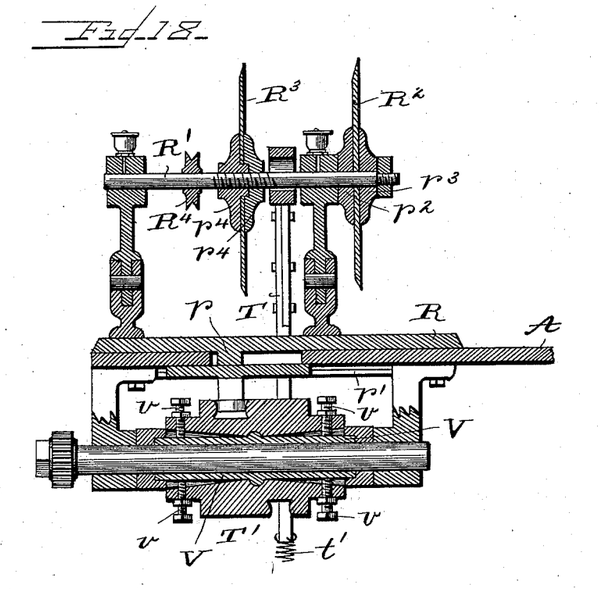
Fig. 18 is a longitudinal sectional view of the cutters.

In order to give the plate or carriage R the proper longitudinally-reciprocating movement, its depending web is provided with a friction-roll which engages a cam-groove in the cam T' on the knife-operating shaft. This cam we prefer to construct as follows: The cam proper is bored out tapering from center toward end and provided centrally with an annular groove. Before it is placed upon the shaft a split brushing V is slipped into the bore of the cam, said brushing having an annular rib for engaging the groove in the cam which is at the narrowest part of its bore. Opposing set-screws $v\ v$ are tapped through the cam and adjusted against the brushing. (See Fig. 18.)

It will be seen that by adjusting the set-screws a greater or less throw can be imparted to the carriage without otherwise changing the cam, and these adjustments will be found of great value in operating the machine. The cams will be so timed as to throw the knives into operation when a length of stem equal to the length of a cigarette has passed the second knife, thus cutting off two cigarettes at an operation and enabling the cutters to be operated less frequently. We may, however, use one knife and operate it more frequently, if desired.

Figure 20:
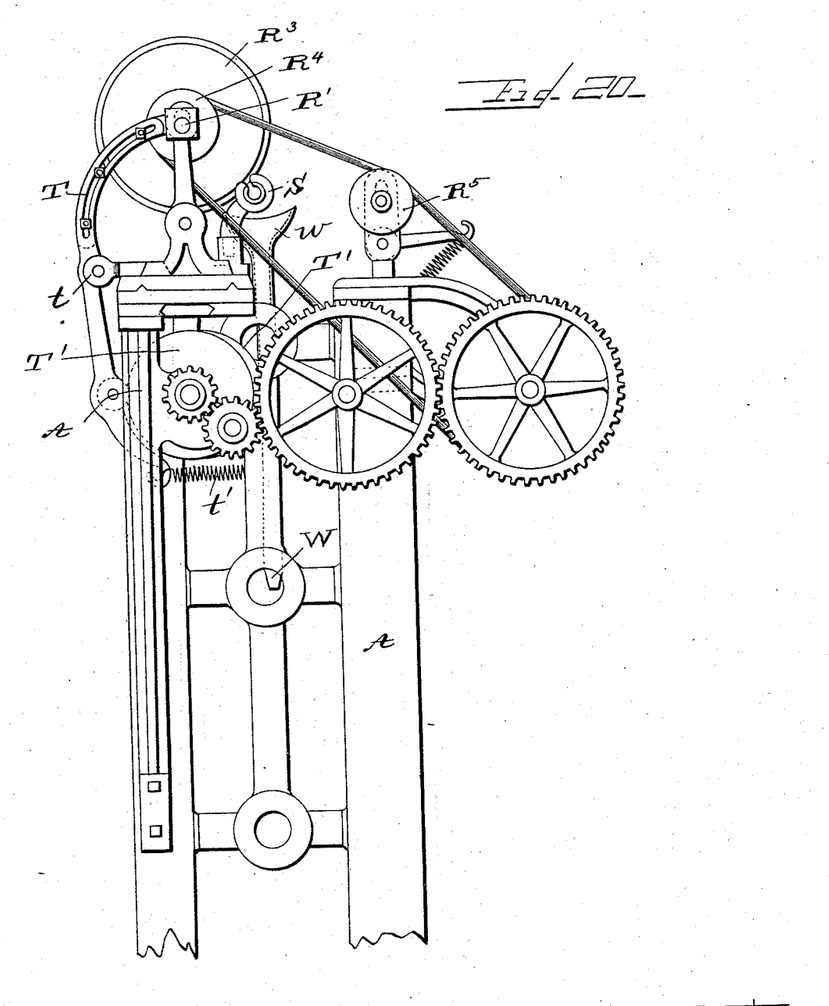
Fig. 20 is a view similar to Fig. 19, but showing additional portions of the machine for driving the cutters and operating the same.

In Fig. 20 we have shown a delivery-tube W for the cut cigarettes, terminating at its upper end in a hopper $w$, into which the cigarettes drop after being severed, and are conducted to any desired point.

The shaft M is preferably formed in two parts, which can be thrown into operative relation by a suitable clutch X, Fig. 1, operated by a hand-lever $x$. By this means when starting the machine the tobacco-feeding and rod-forming devices can be operated without running the stem forming, pasting, and cutting devices. The shaft M is also provided with a pinion O' for driving the stem-forming belt, which pinion is preferably mounted upon a feather, so that it can be moved longitudinally of the shaft into and out of gear with the said belt-driving mechanism by means of a hand-lever $O^2$, thereby enabling the stem-forming belt to be under direct control. We also provide the said belt-driving mechanism with a hand-crank $O^3$, which may be used when the pinion O' is out of gear and will be found desirable in starting the paper through the stem-forming tube.

What we claim, and desire to secure by Letters Patent, is—

1. In a cigarette-machine the tobacco-feeding devices including among their members a conveyer, a multimotioned feeding-rake, the retaining-comb and a cleaner for engaging and removing the tobacco from said rake and operating means, substantially as described.

2. In a cigarette-machine the tobacco-feeding devices including among their members, a conveyer, a series of compressing-rolls disposed above said conveyer in a plane inclined thereto, the multimotioned rake, a retaining-comb and operating means, substantially as described.

3. In a cigarette-machine the tobacco-feeding devices including among their members a conveyer, a series of compressing-rolls disposed above said conveyer in a plane inclined thereto, each of said rolls being operated at greater speed than the preceding roll, the multimotioned rake and the retaining-comb and operating means, substantially as described.

4. In a cigarette-machine the tobacco-feeding devices including among their members a conveyer, a series of compressing-rolls, located above said conveyer, a series of picker-rolls alternating with the compressing-rolls, all of said rolls being located in a plane inclined to said conveyer, each of said rolls being operated at a greater speed than the preceding roll, the multimotioned rake, and the retaining-comb and operating means, substantially as described.

5. In a cigarette-machine the combination with a tobacco-carrying belt, of a dumping device located above the same, a conveyer, the retaining-comb, the multimotioned rake coöperating therewith for removing the tobacco from said conveyer, and delivering it to said dumping device and devices for operating said dumping device to discharge the tobacco upon the tobacco-carrying belt, substantially as described.

6. In a cigarette-machine the combination with the tobacco-carrying belt, of a dumping device located above the same, the tobacco-conveyer, a retaining-comb, a multimotioned rake, a movable cleaner for engaging said rake, and operating means, substantially as described.

7. In a cigarette-machine the combination with the tobacco-carrying belt, of a tobacco-guide located above the same having its sides flaring outwardly adjacent to the tobacco-feeding devices, said sides being provided with gradually-approaching arched portions beyond the feeding devices, dumping devices above said tobacco-guide, tobacco-feeding devices for depositing tobacco upon said dumping devices and operating means, substantially as described.

8. In a cigarette-machine the combination with the tobacco-carrying belt, of the tobacco-guide having arched portions overhanging said belt, the horizontal rod-forming wheels having peripheral flanges above said belt, the vertical grooved forming-wheel having a peripheral portion between the plain portions of the faces of said horizontal wheels and pivoted fingers having arched portions forming continuations of said tobacco-guide and adjusting devices for regulating the pressure of said fingers upon the tobacco, substantially as described.

9. In a cigarette-machine the combination with the stem-forming trough provided with a paper-guide, and belt-guide depending therefrom, and a paper-guiding rod at its inner end, of the forming-tube located in said trough having horizontal guides for engaging the edges of the belt and paper, a belt-guiding rod at its inner end, the stem-forming belt and operating means, substantially as described.

10. In a cigarette-machine the combination with the stem-forming tube and the belt having a portion passing through said tube, of a pivotally-mounted frame carrying the pasting mechanism, devices for securing said frame rigidly in operative position and devices for adjusting said frame and pasting mechanism vertically whereby said pasting mechanism may be released and swung away from said tube and belt, substantially as described.

11. In a cigarette-machine the combination with the stem-forming tube and the belt having a portion passing through said tube, of a pasting mechanism including among its members a pasting-wheel having a beveled pasting edge, a paste-receptacle above said wheel, having a discharge-aperture directly over said beveled edge at a distance from the forming-tube and an adjustable gate for said discharge-aperture, substantially as described.

12. In a cigarette-machine the combination with the stem-forming tube and the belt having a portion passing through said tube, of a pasting mechanism including among its members, a pasting-wheel having a beveled pasting edge, a paste-receptacle above said wheel having a discharge-aperture directly over said beveled face at a distance from the said tube, an adjustable gate for said aperture, a follower in said paste-receptacle, means for moving said follower mechanically to force the paste through said aperture and a hand-operated device for adjusting said follower, substantially as described.

13. In a cigarette-machine a pasting mechanism including a paste-receptacle having an inclined bottom, a follower within the receptacle and a discharge-aperture adjacent to said bottom, a paste-wheel beneath said receptacle having a beveled face beneath said aperture and an adjustable gate for said aperture, substantially as described.

14. In a cigarette-machine the combination with devices for forming a cigarette-stem, and means for adjusting the reciprocating mechanism, to vary the throw of the knives, of a longitudinally-reciprocating cutting mechanism provided with two cutter-blades, one adjustable toward and from the other, means for reciprocating said mechanism and means for forcing said cutters across the path of the said cigarette-stem, substantially as described.

15. In a cigarette-machine the combination with the stem-forming devices, of a reciprocating frame, a pair of cutters mounted thereon, one adjustable toward and from the other, a cam for moving said cutters across the path of said stem and reciprocating said frame longitudinally of said stem, said cam having tapering recessed portions at each end engaging parts connected with its operating-shaft and adjusting devices passing through said recessed portions and engaging the said parts to vary the throw of the cam, substantially as described.

In testimony whereof we affix our signatures in presence of two witnesses.

JOHN E. BUCKLIN.
JOSEPH F. HARTIGAN.

Witnesses:
J. ROSS COLHOUN,
J. D. KINGSBERY.